Patented Apr. 7, 1936

2,036,221

UNITED STATES PATENT OFFICE 2,036,221

METHOD OF PURIFYING ZIRCONIUM SILICATES

Charles J. Kinzie, Niagara Falls, N. Y., assignor to The Titanium Alloy Manufacturing Company, New York, N. Y., a corporation of Maine No Drawing. Application July 1, 1933, Serial No. 678,721

11 Claims. (Cl. 23—16)

My invention relates to novel treatment of ores containing zircon entangled with undesired substances to obtain a highly-refined zircon or zirconium silicate ($ZrSiO_4$), which will contain only minute amounts of impurities, such resulting product being employed in the arts, more particularly in making refractories, porcelains, etc. as well as for other industrial uses.

In United States Letters Patent No. 1,451,004 of April 10, 1923, in which I am a co-inventor, novel methods of treating ores containing zircon along with undesired substances are described so as to obtain a refined zircon containing silica about 36.86%; zirconia 61.50%; alumina 0.74%; iron oxide 0.17%; and titanic oxide 0.50%.

Such product as produced by the processes set forth in Patent No. 1,451,004 therefore yielded a refined zircon of approximately the following mineralogical composition: $ZrSiO_4$ approximately 91.30%; aluminum silicate 1.2%; and free silica 6.63%.

For many purposes this relatively large amount of free silica is detrimental, due to the fact that crystalline forms of free silica, such as are contained in zircon (quartz sand, etc.) have a disruptive effect when used in refractories, porcelains, etc., due to the well-known thermal property of crystalline silica to change in volume at different temperatures as well as to become altered as to its crystalline form.

I have also discovered new methods whereby the product of U. S. Patent No. 1,451,004 may be essentially freed of its contaminating silica, while at the same time additionally removing part of the remaining iron, titanium and other impurities, with the result that a new and useful zircon of hitherto unknown degree of purity is obtained.

Such methods consist essentially in mechanically separating the free silica, and part of other impurities from the lixiviated product set forth in Patent No. 1,451,004, which resulted in an improved zirconium silicate having approximately the following mineralogical composition:

|  | Per cent |
|---|---|
| $SiO_2$ | 32.61 |
| $ZrO_2$ | 66.00 |
| $TiO_2$ | 0.15 |
| $Fe_2O_3$ | 0.10 |
| $Al_2O_3$ etc. | 1.14 |
|  | 100.00 |

The subject matter of that invention is set forth and claimed in my co-pending application for patent filed May 27, 1933, Serial Number 673,322.

The improved zirconium silicate product set forth in my said pending application as regards degree of purity answers for many of the higher grade industrial and other requirements. However, I have found that for certain finer applications, such as in the manufacture of vitreous enamels, glazes, whiteware, glasses, etc., the final result can be advantageously improved if there were available a zirconium silicate containing less titanium and iron.

I have now discovered novel methods by which such an improved $ZrSiO_4$ may be produced, and have by means of these methods produced as a new article of manufacture a zirconium silicate of hitherto unknown degree of purity and excellence.

My new methods consist of milling the refined zircon of either U. S. Patent 1,451,004 or that of my said co-pending application depending upon whether or not the presence of free silica is detrimental, and then nodulizing the so-milled $ZrSiO_4$ with an adhesive material and carbon or carbonaceous material, the amount of carbon depending upon the amount of impurities to be removed.

These nodulized masses are then heated in a suitable reactor to about 950° C., and a suitable halogen gas, such as chlorine, is led over or through such mass, the gas when chlorine is used forming volatile chlorides with the iron, titanium and other impurities which are carried away from the zircon so as to leave the resulting $ZrSiO_4$ in very pure condition.

My invention is based on my discovery that by the use of a limited amount of carbon, ranging from not over 1% to preferably less than ½ of 1% of the mass, the chlorine will remove the impurities without materially effecting the zircon which is left in purer state after treatment. If more carbon is present in the mix, the chlorine tends to be used up by converting the zircon to $ZrCl_4$ and $SiCl_4$. Preferably the amount of chlorine should be only slightly in excess of that required to convert the impurities to volatile chlorides. Such invention also is based partly on my discovery that by first reducing the grain size to suitable fineness, the impurities integral in the zircon grain can be lowered or removed (−35 grains to −325 milled or 0.50 mm. to 0.044 mm.).

My process as practised according to a preferred procedure is effective not only in removing the residual commingled impurities remaining from previous processes of refinement, but also additionally removes impurities existing in the zircon grain itself.

Although chlorine is for purposes of economy the preferred reagent, there can be used halogen gases other than chlorine, such as bromine or iodine.

I have mentioned that carbonaceous matter is incorporated in the zircon mass prior to the chlorination, but it is to be understood that the reducing agent could be a gaseous one, for example, the zircon mass could be treated with a mixture of carbon monoxide and chlorine gases, and again carbonyl chloride ($COCl_2$) could be led over the zircon to effect the purification.

I have explained that the milled zircon is first nodulized, and the resulting nodulized masses are then treated with chlorine. It is, however, possible to treat the powder with equally good results.

For purposes of commercial economy, the milled zircon is preferably nodulized so as to permit filling a suitable reactor with the nodules which leave interstitial spaces for the free passage of the gaseous reactive agent or agents, as well as allowing of a free exit for the formed volatile chloride impurities which it is desired to remove from the zircon. If the zircon is to be treated in powder form, it may be done most effectively in an externally heated rotary reactor, the powder being fed continuously into rotary tube kiln in a direction opposite to path of the reactive gas. The powder may be also treated in a thin stationary layer on a moving or stationary hearth.

In the preferred method which I will describe, the treatment of the nodulized masses permits of maximum utilization of supplied heat as well as of the reactive gas, since the nodules fill the reactive zone of vessel, so as to leave practically no waste space.

Lampblack has been set forth as the carbon material added, but other forms of carbon may be used, such as graphite, petroleum coke, soft coal, etc. Gum tragacanth has also been described as the preferred bonding agent, but other materials such as dextrine, sugar, glue, etc. would serve equally as well.

The carbon may also be wholly supplied in the form of a bonding agent soluble in water, for example, enough gum, sugar, dextrine, glue, etc. may be used to supply the required amount of carbon. Again the charge may be prepared by heating it with molten pitch or tar, or the latter could be dissolved in suitable solvent, such as benzene or toluene, and then mixed with the zircon. The zircon may also be dry mixed with the required amount of carbon, and then briquetted under pressure into suitable shapes for treatment.

My improved methods, therefore, may be practised in many ways in order to intimately contact the impurities in the zircon with a reducing agent.

My methods are preferably practised with milled zircon reduced to a sufficiently fine state to allow of access of the chlorine to integral as well as commingled impurities, but as the examples will show, my methods have a marked effect upon the treatment of granular (unmilled zircon), although I prefer to work with milled zircon which is more readily nodulized and also more effectively treated according to my improved methods.

In the following examples, "Examples A and F" are preferred procedures by which the new zircon product is produced, while "Example B" is illustrative of a result obtained by treating the same grade of zircon in a granular state. "Example C" shows the result of treating crude milled zircon, while "Example D" shows the result of treating same grade of crude zircon in granular state. "Example E" shows the use of bromine as the reactive agent.

It will be observed that although my new methods are particularly intened for the production of a zircon of great purity and refinement, the process may be used in the direct purification of crude zircon ores with the obtainment of zircon products suitable for some of the less fine applications of commerce. The product of "Example B" or of "Example C or D" could of course be subjected to further treatment, or preferably to a retreatment to obtain a still purer product.

Example A

Zirconium silicate containing approximately

|  | Per cent |
|---|---|
| $TiO_2$ | 0.20 |
| $Fe_2O_3$ | 0.10 | along with other objectionable impurities is milled to approximately −325 mesh, preferably by wet method. Into this milled charge is added approximately 0.05 to 0.10 percent by weight of an organic adhesive, such as gum tragacanth and about 0.20–0.30% lampblack; the charge is then dried to a stiff putty, and while in this condition is shaped into suitable nodules.

This may be done by extruding the mass through a suitable aperture and then drying it, or the putty may be hand-shaped into balls and then dried. For purposes of economy the adhesive should be restricted to that amount required to suitably bond the zircon particles, while supplying any additional carbon required in the form of fine low-priced forms of a suitable carbon, such as lampblack.

The dried nodules or masses should be fairly solid so as to withstand mechanical handling before, during, and after the chlorinating treatment. A small amount of ammonia water may be used in working the mass during the nodulizing operation.

A suitable charge is made up approximately as follows:—

| | | |
|---|---|---|
| Milled zircon (−325 mesh) | 700 | grams |
| Lampblack | 2 | do |
| Water containing 0.35 gram gum tragacanth | 118 | c. c. |
| Strong ammonia water | 3 | do |

The charge is well mixed, and after shaping into any suitable form is dried until the masses are firm, and possess sufficient strength to permit of handling.

The nodulized product is then charged into a suitable reactor, preferably an upright tube of refractory or other material which is resistant to action of the chlorine at the temperatures used, and which will be practically gas-tight. Suitable connections permit the chlorine to be passed through the charge and to collect the volatilized impurities. The charge is supported in the hot zone by any suitable shape of any suitable structural material.

This reaction vessel is heated externally by any suitable device to a temperature at which the desired reactions will occur. With the hereindescribed charge, a temperature of approximately 950° C. is satisfactory. The chlorine is led in as a slow stream supplying only a slight excess over the amount required for conversion of impurities to volatile chlorides. The reaction is continued until there is practically no further evolution of chlorides from the zircon mass.

The purified zircon product as produced in the above procedure contained by analysis:

| | Per cent |
|---|---|
| $TiO_2$ | Nil |
| $Fe_2O_3$ | 0.03% |

Such purified product is snow-white in color, and the nodules may be readily disintegrated to a fine powder by any suitable means.

The product is of particular value in supplying zirconium into enamel, glaze and glass composition which are required to be either colorless or an immaculate whiteness. This is made possible because the titanium is now absent or practically so, and since the iron has been reduced to a negligible amount. Small amounts of tin as well as of other impurities would also be removed by this process.

This is important since experience in ceramics in attempts to obtain pure white products has shown that both titanium and tin are potent discolorative agents in combination with small amounts of chromium. For example, a tin glaze which might in absence of chromium yield a fairly white color will, due to presence of traces of chromium in the kiln atmosphere, yield a decidedly pink glaze. Titanium in a glaze reacts with chromium in much the same manner. Therefore by the removal of these impurities, mainly titanium, tin, iron and other impurities, the zirconium compound is then allowed to produce the pure white results which it can do only when these contaminating impurities are absent.

This zirconium silicate product has proved useful as a constituent of chinaware, porcelains and other bodies in which the advantageous properties of zirconium are desired, while at the same time it is necessary to produce articles of fine pure color. Such novel product may also be advantageously used as a starting point in the production of various pure zirconium compounds.

*Example B*

Granular zircon —35 mesh and finer containing—

| | Per cent |
|---|---|
| $TiO_2$—approximately | 0.20 |
| $Fe_2O_3$—approximately | 0.10 | was placed in a graphitic carbon tube which was placed in a reaction chamber and then heated in contact with chlorine gas at temperature of about 950° C.

After treating three hours the zircon contained

| | Per cent |
|---|---|
| $TiO_2$ | 0.02 |
| $Fe_2O_3$ | 0.06 |

Although the degree of purification was not as complete as in preferred "Example A", the process resulted in an important degree of impurity removal, and indicates that my methods need not be confined to the use of —325 mesh milled zircon.

*Example C*

Crude zircon sand in natural condition as produced by concentration from zircon-bearing sands, and containing—

| | Per cent |
|---|---|
| Titanium (calculated as $TiO_2$) | 7.90 |
| Iron (calculated as $Fe_2O_3$) | 0.59 | was treated in the following manner:

The zircon sand was first wet-milled to —325 mesh, and then dried. A change containing the following ingredients was then made:—

| | Grams |
|---|---|
| Crude zircon —325 mesh | 650 |
| Cane sugar | 162 |
| Petroleum coke | 26.1 |

This charge was dry mixed and placed in a paper cartridge which in turn was placed in a clay crucible and surrounded with carbon, such as petroleum coke or soft coal, and the whole was heated to a red heat with formation of a coherent mass, which after cooling was broken up into lumps about one-half inch size and treated in a reactor with chlorine gas at temperature of about 950° C. for three hours.

The residual product was calcined to remove the surplus of carbon, and upon analysis was shown to contain approximately the following:

| | Per cent |
|---|---|
| Silicon (calculated to $SiO_2$) | 36.56 |
| Titanium (calculated to $TiO_2$) | 0.43 |
| Iron (calculated to $Fe_2O_3$) | 0.15 |

The $TiO_2$ was reduced from 7.90% to 0.43%, while the iron was reduced from 0.59 to 0.15 expressed as $Fe_2O_3$.

*Example D*

Crude zircon sand was produced by concentration of zircon bearing sands and containing approximately:

| | Per cent |
|---|---|
| Titanium (calculated as $TiO_2$) | 7.90 |
| Iron (calculated as $Fe_2O_3$) | 0.59 |

In the granular unmilled condition a charge was made in the following manner:

| | Grams |
|---|---|
| Crude zircon sand | 650 |
| Cane sugar | 162 |
| Petroleum coke | 36.1 |

This was dry mixed and placed in paper cartridge which was surrounded with carbon, such as petroleum coke or soft coal, in a clay crucible and heated to above a red heat to produce a briquette which after cooling was broken down to about ½ inch sizes. This broken product was then heated in contact with chlorine gas at about 950° C. for three hours. The residual zircon product was calcined in air to remove surplusage of carbon, and upon analysis contained the following:

| | Per cent |
|---|---|
| Silicon (calculated as $SiO_2$) | 33.12 |
| Titanium (calculated as $TiO_2$) | 5.11 |
| Iron (calculated as $Fe_2O_3$) | 0.33 |

The following tabulation will serve to illustrate the composition of the initial charges as well as of the final products in Examples A to D inclusive:

| | A | B | C | D |
|---|---|---|---|---|
| Zirconium—calculated as $ZrO_2$ | 64.80 | 65.70 | 46.33 | 47.50 |
| Silicon—calculated as $SiO_2$ | 33.60 | 33.00 | 28.00 | 26.83 |
| Carbon—calculated as C | 00.29 | None | 10.70 | 10.70 |
| Gum tragacanth | 00.05 | None | None | None |
| Titanium—calculated as $TiO_2$ | 0.20 | 0.20 | 6.89 | 6.89 |
| Iron—calculated as $Fe_2O_3$ | 00.12 | 0.10 | 0.50 | 0.50 |
| Other rare earths, etc., $Al_2O_3$+$P_2O_5$ | 00.94 | 1.00 | 7.58 | 7.58 |
| | 100.00 | 100.00 | 100.00 | 100.00 |

*Final products after calcination to remove surplus of carbon*

|  | A | B | C | D |
|---|---|---|---|---|
| Zirconium—calculated as $ZrO_2$ | 65.23 | 65.60 | 58.86 | 55.44 |
| Silicon—calculated as $SiO_2$ | 34.00 | 33.42 | 36.50 | 33.12 |
| Titanium—calculated as $TiO_2$ | Nil | 0.02 | 0.43 | 5.11 |
| Iron—calculated as $Fe_2O_3$ | 0.02 | 0.06 | 0.15 | 0.33 |
| Other rare earths, etc., $Al_2O_3 + P_2O_5$ | 0.75 | 0.90 | 4.00 | 6.00 |
|  | 100.00 | 100.00 | 100.00 | 100.00 |

*Example E.—(Bromine used as a reactive agent to remove impurities)*

Zirconium silicate ($ZrSiO_4$) is first milled to —325 mesh, or finer than 0.044— mm. in particle size.

A charge is then made up of the following materials:

| | |
|---|---|
| Milled zircon _____ grams__ | 700 |
| Lampblack _____ do____ | 2 |
| Water containing 0.35 gum tragacanth _____ c. c.__ | 118 |
| 0.90 sp. gr. $NH_4OH$ _____ do____ | 3 |

The charge should be well mixed to ensure intimate contact of the carbon with the zircon particles, and then shaped into ball-like nodules about one inch in diameter and dried. These nodules were of the following approximate composition:

| | |
|---|---|
| Zircon calculated as ($ZrO_2$) _____ | 64.80 |
| Silicon calculated as ($SiO_2$) _____ | 33.60 |
| Lampblack _____ | 00.29 |
| Gum Tragacanth _____ | 00.05 |
| Iron calculated as ($Fe_2O_3$) _____ | 00.12 |
| Titanium calculated as ($TiO_2$) _____ | 00.20 |
| Others $Al_2O_3$, $P_2O_5$ rare earths, etc._____ | 00.94 |
|  | 100.00 |

The nodules are then placed into a gas-tight reactor, and a stream of carbon dioxide led in to displace the air and then the reactor is heated externally to a temperature of about 950° C. The bromine which is a liquid was contained in a bottle into which a slow stream of $CO_2$ gas was led and the outgoing stream of $CO_2$ carrying bromine was led through the nodules of $ZrSiO_4$ which has the desired effect of removing the major part of both titanium and iron from the $ZrSiO_4$.

The duration of run was three hours at 950° C.

The nodules were then removed from the reactor and gently calcined to oxidize any remaining carbonaceous matter, and the following analysis represents the chemical composition of the final product as obtained by bromination of zircon to remove impurities:

| | |
|---|---|
| Zirconium—calculated as ($ZrO_2$) _____ | 65.25 |
| Silicon—calculated as ($SiO_2$) _____ | 33.98 |
| Titanium—calculated as ($TiO_2$) _____ | 0.03 |
| Iron—calculated as ($Fe_2O_3$) _____ | 0.04 |
| Other rare earths, etc. $Al_2O_3 + P_2O_5$ _Others_ | 0.70 |
|  | 100.00 |

I have also produced a zirconium silicate containing +99% $ZrSiO_4$ from the treatment of crude zircon to free same from commingled impurities according to the following example.

*Example F*

I first produce an artificially prepared zirconium silicate containing—

| | Per cent |
|---|---|
| $ZrO_2$ | 32.50 |
| $SiO_2$ | 66.75 |
| $TiO_2$ | 0.15 |
| $Fe_2O_3$ | 0.10 |
| $Al_2O_3 + P_2O_5$ and rare earths, etc._____ | 0.50 |
|  | 100.00 |

This zirconium silicate is produced by fusion of crude zircon with alkali bisulphate, followed by extraction with water, and then by mechanical concentration free quartz and other impurities are removed. This charge is milled with water in a mill lined with steel by using hardened steel balls to a fineness of 325 mesh (—0.044 mm.) or finer, and then the wet milled product is treated with sufficient 5% sulphuric acid to dissolve the iron worn off in milling, and then the dissolved iron is washed out by any suitable means. There is now added sufficient gum tragacanth and lampblack which is thoroughly incorporated in the mass which is shaped into suitable nodules and dried to form a product containing approximately

| | Per cent |
|---|---|
| Zirconium (calculated as $ZrO_2$) _____ | 66.50 |
| Silicon (calculated as $SiO_2$) _____ | 32.42 |
| Carbon_____ | 0.29 |
| Gum tragacanth_____ | 0.05 |
| Titanium (calculated as $TiO_2$) _____ | 0.15 |
| Iron (calculated as $Fe_2O_3$) _____ | 0.10 |
| Others—$Al_2O_3 + P_2O_5$—rare earths, etc.____ | 0.49 |
|  | 100.00 |

The nodules are treated with chlorine gas at temperature sufficiently high (about 950° C.) and for a period of time sufficient to decompose and convert the iron, titanium and small amounts of other impurities such as tin, etc. into chlorides which upon formation volatilize and are carried out of zircon zone with the zircon left in a purified condition. After gentle calcining, to remove small amounts of residual carbon, the $ZrSiO_4$ remains in a practically pure state represented by the following typical composition:

| | Per cent |
|---|---|
| Zirconium (calculated as $ZrO_2$) _____ | 66.95 |
| Silicon (calculated as $SiO_2$) _____ | 32.63 |
| Iron (calculated as $Fe_2O_3$) _____ | 0.02 |
| Titanium (calculated as $TiO_2$) _____ | Nil |
| $Al_2O_3$, $P_2O_5$ and rare earths, etc._____ | 0.40 |
|  | 100.00 |

This product mineralogically contains approximately 99.5% $ZrSiO_4$.

Iodine as a solid was tried in several experiments by subliming same in a stream of $CO_2$, and leading the vapors over the zircon. This was not as effective in removing the titanium and iron as completely as was the case in the examples using chlorine or bromine.

The final product from this iodination treatment contained

| | Per cent |
|---|---|
| $TiO_2$ | 0.15 |
| $Fe_2O_3$ | 0.075 |

Since both bromine and iodine are materials of relatively high price as compared with chlorine, chlorine would always be used from a practical stand-point for the purposes of economy.

It will be observed that by the methods hereinbefore described, I have produced a new form of zirconium silicate of hitherto unknown degree of purity, for instance, by the preferred procedure of "Examples A and F", and also have set forth novel methods of producing a zirconium silicate of reasonable purity from crude zircon, according to "Examples C and D".

I claim as my invention:—

1. The method of purifying zirconium silicate to produce from granular zircon+99% ZrSiO$_4$ essentially free of iron and titanium, which comprises finely milling the said zircon, and then heating said finely-milled zircon mixed in intimate contact with a limited amount of carbon in the presence of a halogen gas in an amount in excess of that required to reduce and volatilize the impurities in said zircon, including substantially all the iron and titanium, but without materially affecting the thereby purified zirconium silicate.

2. The method of purifying zirconium silicate to produce from granular zircon+99% ZrSiO$_4$ essentially free of iron and titanium, which comprises finely milling the said zircon, and then heating said finely-milled zircon mixed in intimate contact with a limited amount of carbon in the presence of a halogen gas in an amount in excess of that required to reduce and volatilize the impurities in said zircon, including substantially all the iron and titanium, at about 950° C. but without materially affecting the thereby purified zirconium silicate.

3. The method of purifying zirconium silicate to produce from granular zircon+99% ZrSiO$_4$ essentially free of iron and titanium, which comprises finely milling the said zircon and then heating said finely-milled zircon mixed in intimate contact with a limited amount of carbon in the presence of chlorine in an amount in excess of that required to reduce and volatilize the impurities in said zircon, including substantially all the iron and titanium, at about 950° C. but without materially affecting the thereby purified zirconium silicate.

4. The method of purifying zirconium silicate to produce from granular zircon+99% ZrSiO$_4$ essentially free of iron and titanium, which comprises finely milling the said zircon and then heating said finely-milled zircon mixed in intimate contact with a limited amount of carbon in the presence of bromine in an amount in excess of that required to reduce and volatilize the impurities in said zircon, including substantially all the iron and titanium, at about 950° C. but without materially affecting the thereby purified zirconium silicate.

5. The method of producing from finely-milled zircon a purified and highly refractory zirconium silicate (+99% ZrSiO$_4$), essentially free of iron and titanium, which comprises subjecting a nodulized mixture of said zircon and a limited amount of carbon in intimate contact with said zircon to the action of a halogen gas in an amount in excess of that required to convert the impurities therein at elevated temperatures, whereby said impurities including substantially all the iron and titanium are reduced and volatilized, but without materially affecting the thereby purified zirconium silicate, and removing and pulverizing said purified zirconium silicate.

6. The method of producing from finely-milled zircon a purified and highly refractory zirconium silicate (+99% ZrSiO$_4$), essentially free of iron and titanium, which comprises subjecting a nodulized mixture of said zircon and a limited amount of carbon in intimate contact with said zircon to the action of a halogen gas in an amount in excess of that required to convert the impurities therein at a temperature of about 950° C., whereby said impurities including substantially all the iron and titanium are reduced and volatilized, but without materially affecting the thereby purified zirconium silicate, and removing and pulverizing said purified zirconium silicate.

7. The method of producing from finely-milled zircon a purified and highly refractory zirconium silicate (+99% ZrSiO$_4$), essentially free of iron and titanium, which comprises subjecting a nodulized mixture of said zircon and a limited amount of carbon in intimate contact with said zircon to the action of chlorine in an amount in excess of that required to convert the impurities therein at elevated temperatures, whereby said impurities including substantially all the iron and titanium are reduced and volatilized, but without materially affecting the thereby purified zirconium silicate, and removing and pulverizing said purified zirconium silicate.

8. The method of producing from finely-milled zircon a purified and highly refractory zirconium silicate (+99% ZrSiO$_4$), essentially free of iron and titanium, which comprises subjecting a nodulized mixture of said zircon and a limited amount of carbon in intimate contact with said zircon to the action of chlorine in an amount in excess of that required to convert the impurities therein at a temperature of about 950° C., whereby said impurities including substantially all the iron and titanium are reduced and volatilized, but without materially affecting the thereby purified zirconium silicate, and removing and pulverizing said purified zirconium silicate.

9. The method of producing from finely-milled zircon a purified and highly refractory zirconium silicate (+99% ZrSiO$_4$), essentially free of iron and titanium, which comprises subjecting a nodulized mixture of said zircon and a limited amount of carbon in intimate contact with said zircon to the action of bromine carried by carbon dioxide gas in an amount in excess of that required to convert the impurities therein at elevated temperatures, whereby said impurities including substantially all the iron and titanium are reduced and volatilized, but without materially affecting the thereby purified zirconium silicate, and removing and pulverizing said purified zirconium silicate.

10. In the method of purifying a zirconium silicate obtained from heating ores containing zircon commingled with impurities mixed with an alkali metal bisulphate and lixiviating the resulting mass with separation of the dissolved salts, free silica, and precipitated impurities to obtain a partly-purified zirconium silicate, the steps which comprise mixing said partly-purified zirconium silicate in a finely-milled condition with an adhesive and a limited amount of carbon in intimate contact with said zirconium silicate and nodulizing the mixture, and then heating the nodulized mass to about 950° C. in the presence of a halogen gas in an amount slightly in excess of that required to reduce and volatile the remaining impurities including substantially all the iron and titanium from the nodulized zirconium silicate.

11. In the method of purifying a zirconium silicate obtained from heating ores containing zircon commingled with impurities mixed with an alkali metal bisulphate and lixiviating the resulting mass with separation of the dissolved salts, free silica, and precipitated impurities to obtain a partly-purified zirconium silicate, the steps which comprise mixing said partly-purified zirconium silicate in a finely-milled condition with an adhesive and a limited amount of carbon in intimate contact with said zirconium silicate and nodulizing the mixture, and then heating the nodulized mass to about 950° C. in the presence of chlorine in an amount slightly in excess of that required to convert the remaining impurities including substantially all the iron and titanium into volatile chlorides, and removing same without materially affecting the zircon from the nodulized zirconium silicate.

CHARLES J. KINZIE.